United States Patent
Ren

(10) Patent No.: US 8,651,207 B2
(45) Date of Patent: Feb. 18, 2014

(54) CIRCUMFERENTIAL MOVEMENT DEVICE

(75) Inventor: Wen Lin Ren, Wuhan (CN)

(73) Assignee: Keren Wang, Shenzhen (CN)

( * ) Notice: Subject to any disclaimer, the term of this patent is extended or adjusted under 35 U.S.C. 154(b) by 0 days.

(21) Appl. No.: 13/442,836

(22) Filed: Apr. 9, 2012

(65) Prior Publication Data

US 2012/0255797 A1    Oct. 11, 2012

Related U.S. Application Data

(63) Continuation of application No. 12/343,483, filed on Dec. 24, 2008, now Pat. No. 8,172,017.

(30) Foreign Application Priority Data

Jan. 21, 2008    (CN) ...................... 2008 2 0002487 U

(51) Int. Cl.
    *B60K 6/08*    (2006.01)
(52) U.S. Cl.
    USPC ...................................... 180/65.21; 180/210

(58) Field of Classification Search
    USPC ........... 180/165, 2.1, 2.2, 210, 215, 219, 220, 180/65.1, 301, 302, 65.21
    See application file for complete search history.

(56) References Cited

U.S. PATENT DOCUMENTS

| | | | | |
|---|---|---|---|---|
| 4,011,919 | A * | 3/1977 | Groeger | 180/190 |
| 7,017,696 | B2 * | 3/2006 | Pal | 180/218 |
| 2001/0042650 | A1 * | 11/2001 | van den Berg | 180/218 |
| 2001/0047902 | A1 * | 12/2001 | Berg | 180/219 |

* cited by examiner

*Primary Examiner* — John Walters

(57) ABSTRACT

The invention relates to circumferential movement field, including all circumferential movement devices such as transport vehicle, toy vehicle, space vehicle, blender etc, especially for energy-saving vehicles utilizing force of gravity. The energy-saving vehicle utilizes force of gravity as driving force, the vehicle body connects with the wheel by swing structure method or eccentric swing structure to utilize force of gravity more efficiently. The invention also provides solutions about two-wheel gravitational vehicle and multi-wheel vehicle and train connected by integrated vehicles or two-wheel vehicles.

18 Claims, 11 Drawing Sheets

A – A

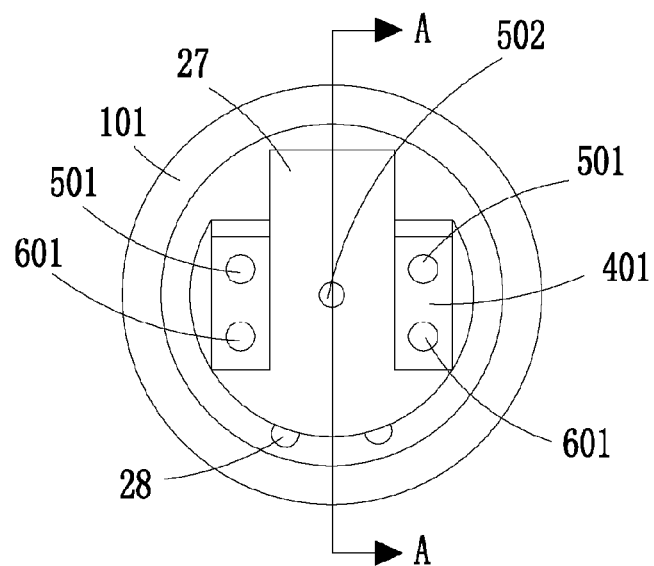
Fig. 16
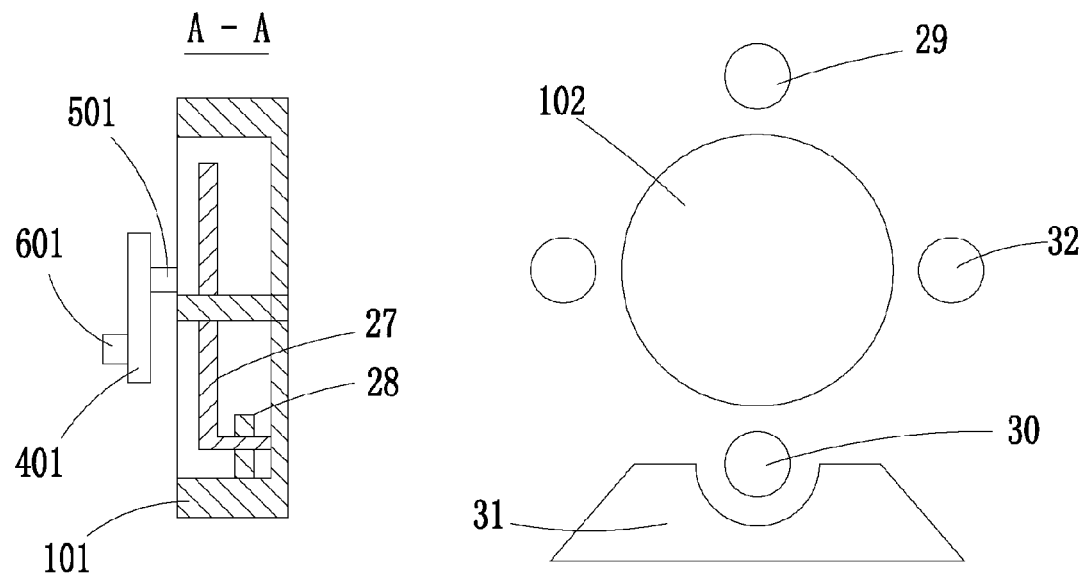
Fig. 17
Fig. 18

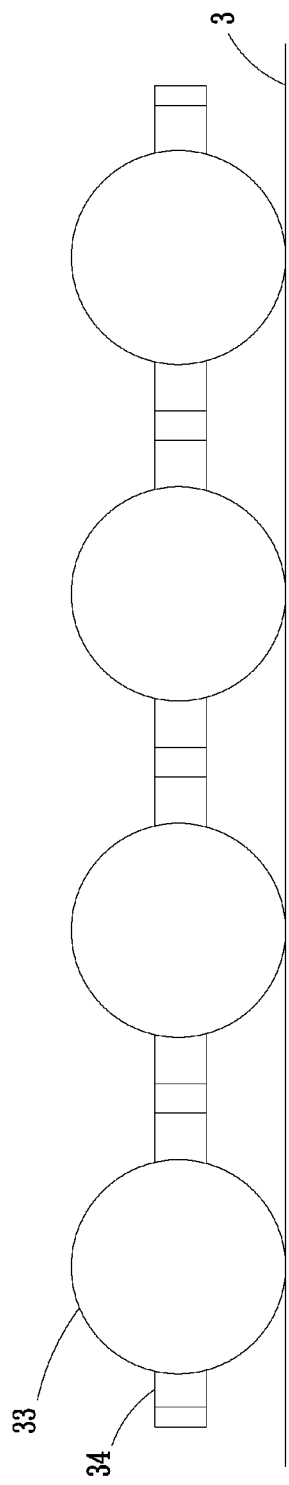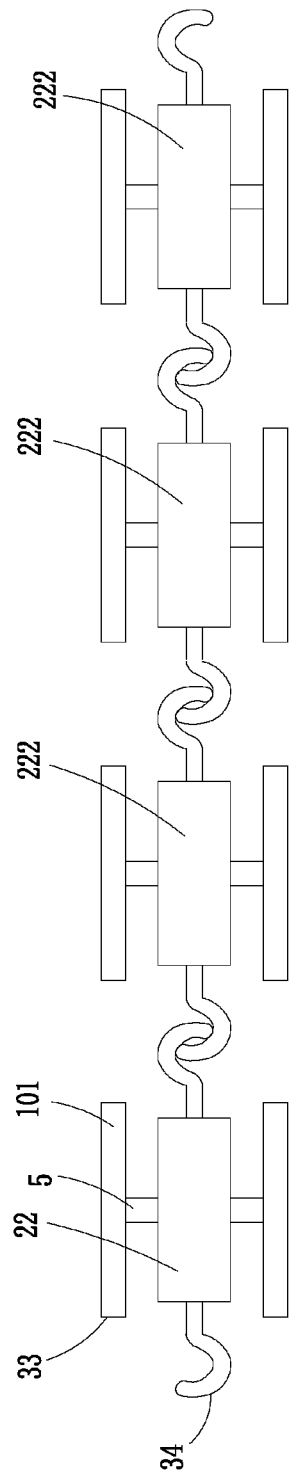

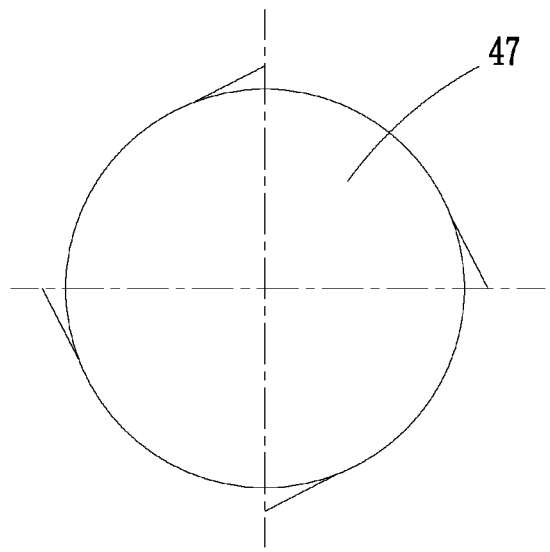
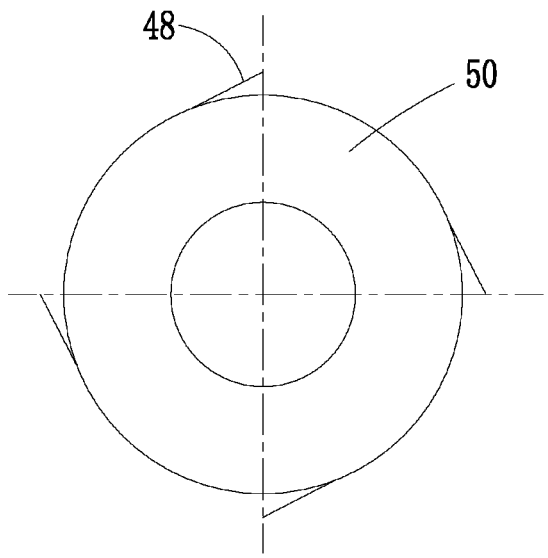
Fig. 34          Fig. 35
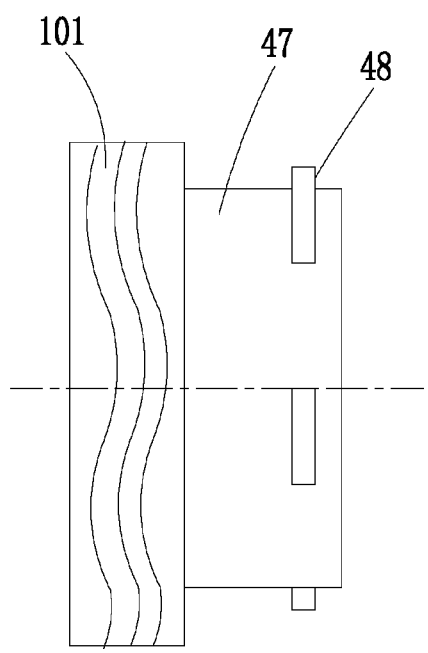
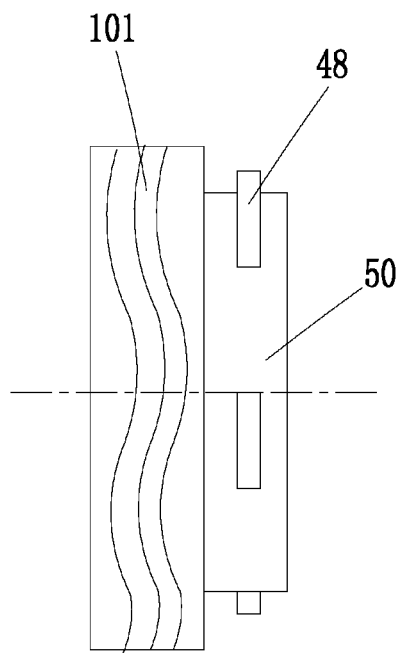
Fig. 36          Fig. 37

CIRCUMFERENTIAL MOVEMENT DEVICE

The present invention is a Continuation Application of U.S. application Ser. No. 12/343,483, entitled Circumferential Movement Device, filed in the name of REN, Wen Lin on Dec. 24, 2008 now U.S. Pat. No. 8,172,017, with a priority date of Jan. 21, 2008.

FIELD OF THE PRESENT INVENTION

The present invention relates to circumferential movement, especially to all circumferential movement devices utilizing force of gravity, such as transport vehicles, toy vehicles, space vehicles, blenders etc.

SUMMARY OF THE PRESENT INVENTION

The object of the present invention is to provide circumferential movement devices with new structures and new driving methods, including vehicles with new structures and corresponding driving methods, braking methods and steering methods etc. The devices can utilize force of gravity sufficiently and shall be safe, saving and high efficient. The device can be used in all circumferential movement devices such as transport vehicle, toy vehicle, space vehicle and blender and so on.

The disclosure of this invention is introduced as following.

1. Integrated vehicle. The integrated vehicle includes wheels and vehicle body. The vehicle body can be shaped as cylinder, square or polygonal canister. The vehicle body shall keep a certain distance from the road surface so as to ensure the movement of the vehicle. Wheels are installed at the middle or two ends of the vehicle body and are rotated with the vehicle body at same time in movement.

Such vehicle may has one wheel and installed at the middle of the surface of the vehicle body; or such vehicle has one wheel only, the width of tire reaches to ⅓ of the width of the vehicle body or above; or the tire shall include tire and part of rim. Such tire shall include all kinds of tires of related technology.

The tire surface shall be in sufficient width to ensure the vehicle drives on road placidly. Or the whole vehicle is just a wheel. Or several wheels can be installed on the surface of the vehicle.

Or, two or two group wheels are to be installed at two ends of the vehicle body. The two ends of the body shall include the surfaces of two ends and the positions near the two ends.

One tire can be comprehended as one group tires, i.e. one tire can be substituted by two or above tires to play the role of one tire. Tire is installed on the body and is rotated with the body as well as the cargo inside the vehicle together.

The width of tire can be preset according to related technology. One tire can be comprehended as one group tires, i.e. one tire can be substituted by two or above tires to play the role of one tire. Tire is installed on the body and is rotated with the body as well as the cargo inside the vehicle together.

The wheel includes tire and rim; here, rim includes all parts inside the tire of the wheel. But, the wheel which is installed on the integrated vehicle shall have tire only, or has tire and part of rim. The vehicle body can replace part or all rim. The wheel may include tire and part of rim.

No driving force is needed when the vehicle drives downgrade, only the driving force greater than zero is needed when the vehicle drives on flat ground theoretically, when upgrade, more energy can be saved than other vehicles with related structure due to it can utilize the gravity force better. Such vehicle is comparatively suitable to carry water, oil, cement, sand, slurry, coal, and ore, etc, and there are inlet and outlet of cargo.

A trailer rack can be installed on the integrated vehicle to be used as a trail car, the integrated vehicle is rotated relative to the trailer rack on its axis, and the trailer rack connects with the motive vehicle, the trailer rack moves on by dragging of the integrated vehicle. The integrated vehicle can be used as boxcar of a train. Several integrated vehicle with the trailer tracks can be run as a train, such train shall at least include a head and several boxcars with trailer racks and pothooks, these boxcars move and be dragged by the head.

The integrated vehicle may be driven by the engines and transmission device with related technology. There is a trailer rack on the vehicle body, the trailer rack shapes as a frame and carries one or more trailer wheels. The trailer wheel adopts related technology. An engine is fixed on the trailer rack and a transmission device is fixed on the vehicle body to receive the transmission force from the engine. For example, a rubber roller with related technology transmits the driving force to the integrated vehicle; an electromotor is fixed on the top of the trailer rack, a rubber roller is on the axis of the electromotor, there is a rubber loop on the vehicle body to receive the friction from the rubber roller, the rubber roller drives the rubber loop and pushes the vehicle to move together.

Gear wheel or gear hole driving with related technology are also be available. China Patent application number 200410030581.x<A Sort of Vehicle>, FIG. 54-59 shows a kind of gear hole driving. It is also available to adopt remote control method to operate the integrated vehicle—unpiloted driving.

2. Swing structure vehicle. The swing structure vehicle includes a vehicle body at least one wheel, and a swing bar for connecting the vehicle body and the wheel. There is an axis on the vehicle body and an axis at the centre of a wheel, one end of the swing bar connects with the body axis, the other end of the swing bar connects with the wheel axis. The body axis can also connect with the "dolly-car" at the bottom of the wheel, dolly-car "dolly-car" is attributed to a related technology and can be found in <A Sort of Vehicle>, China Patent number 200410030581.x, viz. a "dolly-car" in "large wheel driving method". The vehicle body with swing structure is capable to match up the flirt of the wheel as like as pendulum and swing. As long as the barycenter of the vehicle body is not higher than the circle centre of the wheel, the swing structure can keep the vehicle in balance and stabilization.

The advantage of it can move the weight of the vehicle to the frontage of the gravity surface of the wheel and produce driving force. The position of the vehicle moves ahead can reduce the pressure to the vehicle body and change the force direction, to generate the component of forces and save energy.

The extent of swing can be controlled to keep it fore-and-aft, or only keep it go forwards, or limit the extent when it swings fore-and-aft: preset caging position on the body, swing bar or wheel, the caging device can be a stake, step or spring and set it at the side of swing bar, swing bar will be held up at a certain angle.

Another swing structure is use a swing bar with a bend and concave structure as a crank shaft in an internal-combustion engine to integrate with the axles of the body, swing bar and wheel within the swing structure. The vehicle body installs inside the concave and can swing fore-and-aft, more the space of the concave, and more the swing radius of the body. The sufficient wheel diameter in such structure is necessary to ensure the swing radius.

A swing bar can be a shaft, or a wobble tray. The wobble tray can be shaped like a circle or semicircle, or anomalous to play a role of swing bar. A swing bar can decline the barycenter of the body and increase its stability.

The stress point of the force of an engine can be at the wheel fringe. "Wheel flange transmission" and "large wheel transmission" with related technology can be driven on the top of a wheel, refer to China Patent application 200410030581.x<A Sort of Vehicle> for details of "Wheel flange transmission" and "large wheel transmission". The vehicle body can be dragged as like as a trailer car, the body drives the swing bar, the swing bar drives the wheel and push the vehicle moves on.

3. Eccentric swing structure—the diameter of the vehicle body axis is smaller than that of axis hole of the wheel at the circle centre. In other words, the diameter of the wheel axis hole at the circle centre is greater than that of the vehicle body (the vehicle body axis here can also be swing bar axis). The body axis connects with the wheel axis hole and be located at the fringe of the bottom of inner loop of the axis. The body axis can change its position in the axis hole when in movement, it can be departed from the gravity surface and swing to the direction of forward, thus, the gravity force changes to the driving force.

Axis hole means the hole at the inner loop of the axis. The connection method between the vehicle body axis and the axis hole can use related technologies as welding, affixing and covering. The method of covering: connect the vehicle body axis with the inner loop cover which matches up to the inner loop of the axis hole, the inner loop cover shapes like a round cake, and fix it into the inner loop. The vehicle body axis is located at the fringe of the bottom of inner loop of the axis, i.e. the bottom fringe of the inner loop.

Such structure is "eccentric swing", or "eccentric axis". Eccentric swing can be used in the connection of swing, also can be used in all circle movements except the swing connection, e.g. wheel axis, to save energy by its gravity force.

4. Coaxial vehicle—also can be named as "two-wheel gravitational vehicle", "two-wheel vehicle" or "sole-wheel vehicle". A coaxial vehicle can has two or two group coaxial wheels which are located in the two sides of the body or bottom. Wheel runs relative to the vehicle body, and engine installed on the vehicle body be regarded as the passenger seat. The wheel of coaxial vehicle in this invention contains the wheels with same axial direction. Coaxial means two or two group wheels share with same axis. Same axial direction means two or two group wheels with different axes are within the same straight line and same axial direction. Two sides as above said means the surfaces of two profiles of the body and the positions near to the two ends of the body.

An axis at the circle centre of the wheel connects with the vehicle body, wheel runs relative to the body, the body does not rotate. The wheel of coaxial vehicle can be larger; its diameter is similar with the height of the body. A distance of wheel radius shall keep from the ground to convenient to design sufficient space and height for the vehicle body; the vehicle body does not touch the ground when it in swing. Such vehicle may carry an anchoring plate which can be ascending and descending to act as a brake.

A coaxial vehicle may have only one wheel; such wheel is rather wide and is located at the bottom of the body. The vehicle body connects with the wheel axis and is located on the top of the wheel. "Large wheel transmission" can also be adopted to connect the vehicle body with a "dolly-car".

A coaxial vehicle contains the wheels with the same axial direction. The wheels with the same axial direction can be in different axial positions, i.e. the wheels with the same axial direction can disposed at front and rear positions, not in a same straight line. Such structure can increase the stability of the vehicle body, but the utilization of the gravity force is not so good.

There are engine and transmission device on the vehicle body, the method of the impetus transmission: transmit the engine driving force to the position on the vehicle body above the wheel first, then transmit to the top fringe of the wheel and drive the wheel running. Or, transmit the strength of human to the top position of the wheel of the vehicle body first, then drive the wheel. For example, lay an electromotor on the top position of the wheel corresponding to the body, by transmission device or rubber roller, the engine drives the wheel running. Other methods also can be adopted, such as to use wheel engine to drive.

In the structures as described above, an electromotor can also be laid at the bottom of the vehicle body, by transmission device, to transmit the engine driving force to the wheel. It is better to dispose the human, cargo and the vehicle facilities to the bottom of the body to decline the gravity centre and ensure the stability and utilize the gravity force perfectly.

It is also possible to lay the barycenter of the vehicle body on the circle centre of the wheel so as convenient to use swing structure; such structure shall be equipped with a supplementary wheel. Such supplementary wheel shall be installed at the front or rear position of the vehicle body and to play a balance role and prevent the overturn of the vehicle body. Such vehicle belongs to "multi-wheel vehicle".

To drive a coaxial vehicle by human power, it is only need to transmit the human power to the top of the wheel to realize "wheel flange transmission" or "large wheel transmission" by related technology. For example, by a chain and a gear of bicycle, or transmission shaft and gear, or industrial strap and strap wheel, etc, to transmit the human power to the stress point on the top of the wheel to complete the transmission by human power. The driving of engine can also adopt above structure.

The differences of this structure with <A Sort of Balance-able Vehicle> of patent No.: 200310112992.9 are the driving force and transmission method. This structure provides with a technical resolution of engine driving, transmit the driving force of the engine or human power to the top or the fringe of the wheel, sufficiently use gravity and belongs to "wheel flange transmission" or "large wheel transmission".

The stress point of "two-wheel vehicle" is same as the force point of a lever and stress the strength to the top of the wheel; the position wheel touch the ground is same as the pivot of a lever, the pivot is at the ground; the weight of the body is at the circle centre or at the bottom of the wheel, is same as the stress point of a lever at the circle centre or the bottom of the wheel, such structure matches up the 3rd law of Circumferential Law, the energy and power can be saved. The weight of the body (include passenger and cargo) is disposed at the bottom of the body, by the role of swing, half and more gravity can change to driving force and therefore save power and energy.

The driving force of an engine stresses on the top of the wheel by the top of the vehicle body, the top of the wheel produces a counter force to the top of the vehicle body, the bottom of the vehicle body will swing by the leverage, in this way, most of the gravity of the body will transmit to the front of the gravity surface of the wheel, i.e. to the forward direction, more than half of gravity of the vehicle becomes the driving force to drive the wheel.

Compressed air can also be used as the driving force, there is a huff nozzle on the top of the vehicle body, the baffle plate, or lamina, or a concave around the wheel will receive the puffing air, puff the air to the top of the wheel to drive the wheel running by the counter force of puffing air. To use compressed air as the driving force can be adopted according to related technology.

An jet engine can also be installed on the vehicle body such as the jet aircraft and jet car, to puff the air forward the rear of the body and drive the vehicle running and as well as compressed air.

The compressed air tank and engine can fixed in the wheel and run together with the wheel, air switch controls the huff nozzle, huff the air backward when the wheel rotate to the peak and drive the vehicle go forward. Huff will halt when the wheel is over the peak.

The compressed air tank shapes like circle pipe or round cake which is suitable to the shape of tire, it shall be installed the steel rim or the position with the same axial direction outside the wheel. There are several huff nozzles with the valves around tank, the valves shall open only the wheel runs to the peak position and drive the vehicle forward.

The structure of huff switch: there is an elastic cover on the huff nozzle on the wheel, the cover can run around the axis, a baffle plate at the peak position of the wheel, when one huff nozzle runs to the peak position, baffle plate pull out the elastic cover and the high pressure air huff burst out to produce thrust. The elastic cover closes again when the nozzle runs over the baffle plate. Next nozzle will repeat the above movement. Baffle plate can be fixed on the wheel axis.

The second structure of huff switch: there is an elastic piston at the huff nozzle; the piston connects with a pull staff, the pull staff runs around the axis, and there is a baffle plate at the peak position of the wheel, when one huff nozzle runs to the peak position, baffle plate pull out the pull staff of the piston and the high pressure air huff burst out to produce thrust. The elastic cover closes again when the nozzle runs over the baffle plate. Next nozzle will repeat the above movement. Baffle plate can be fixed on the wheel axis.

The third structure of huff switch: there is a magnet at the position of baffle plate, when a huff nozzle runs to the peak position, the attraction of the magnet opens the elastic switch, high pressure air huff out and produce thrust, the elastic cover closes again when the nozzle runs over the baffle plate. Next nozzle will repeat the above movement. Baffle plate can be fixed on the wheel axis again.

The huff nozzle can be controlled by automobile and all related technology, such as gas-jet control technology of internal-combustion engine, ignition technology and touching-switch technology, etc. all related technology can be adopted.

The intermittent blowing, or stroke blowing can also be adopted, blow the air at each interval, e.g. per second. Continuous blowing produces smaller inertial counter force, while intermittent blowing can increase counter force and enhance the effectiveness. Of cause, the air-powered engine with related technology can be adopted as the impetus for this vehicle.

5. Multi-wheel gravity vehicle—means the gravity vehicle with two or more wheels. There are two coaxial wheels on multi-wheel gravity vehicle, including front and rear supplementary wheel. The supplementary wheel are installed at the front and rear of the body to pay the role of auxiliary movement, balance and stability, furthermore, equipped with the flex function upward and downward as well as the function of universal wheel. Automobile and train with related technology can be changed to multi-wheel gravity vehicle. Any vehicle adopts the swing connection and/or eccentric swing structure of this invention can also use "wheel flange transmission" or "large wheel transmission", which is a kind of multi-wheel gravity vehicle. The diameter of the wheel of this kind vehicle is rather small and can be similar or same with the wheels of the vehicles with related technology.

For example, a car with related technology has four wheels, change wheels into swing connection, or only change the rear two wheels into swing connection, adopt "wheel flange transmission" or "large wheel transmission", the impetus of engine stresses on the top of the wheel and the top of the wheel produce a forward counter force to the body, more than half of the body weight changes to impetus and together with the engine power to drive the vehicle.

For multi-wheel vehicle, each wheel can connect with the body swing, or only part of wheels connects with the body swing, e.g. only two rear coaxial wheels in a tricycle connect with the body swing, the front wheel does not. Both multi-wheel and dual wheel gravity vehicles adopt Circumferential Law to utilize gravity.

If adopt small wheel, the radius of the wheel is small accordingly, the vehicle body shall near to the ground and also less the swing extent of the body, this problem can be resolved by related technology "large wheel transmission". Connect the body with the small swing in large wheel, there is a rack on the "dolly-car", the rack can be same height with large wheel or higher. Because the "dolly-car" rack moves relative to large wheel, so the rack may higher than large wheel. Once such body connects with the dolly-car rack which height has been added, the swing extent can be greater. In this case, swing position limit is necessary to avoid the overturn of barycenter. Such structure is available to dual-wheel vehicle too.

"Dolly-car" can be substituted by a large bearing, that means the diameter of the bearing hole is greater than body axis, eccentric swing also adopt this kind of bearing. Bearing ball is equal to the wheel of a "dolly-car". The body axis connects with the internal loop of the bearing as the method foresaid. Actually, such structure is a "large wheel transmission". This invention can be adopted by a quadricycle with related technology, use swing structure and regard the front two or rear two wheels as the driving wheels and driven by the engine. Another two wheels adopt large bearing structure as above said, dragged or pushed by the driving wheels. This is also a kind of gravity and such technology can be adopted by any vehicle with related technology.

The technical classification of any integrated vehicle, swing structure and multi-wheel vehicle included in this invention is purposed to describe clearly and easy to comprehend, not mean that such technology should be used solely or synchronously. In practice, all technical resolutions and features in this invention can be utilized solely or synchronously and suitable to combine with related technology.

Any non-impetus vehicle, such as train carriage and trailer car, also can accept such eccentric axis and/or swing connection, when an external force draw the vehicle body, the body swing to the forward direction and get over the gravity surface of the wheel, such gravity changes into impetus, thus can save more energy to draw the vehicle. Eccentric axis can be used in all circumferential substance movement. Any wheel with related technology can adopt such structure.

6. Quadricycle—has two or two group coaxial wheels as main wheels, main wheels are located at the middle bottom of the body. A supplementary wheel is also carried. The supplementary wheel is installed at the front and/or rear part of the body. The main wheels play the roles of loading, driving, braking and turning. The coaxial wheels as foresaid include the wheels with the same axial direction. The coaxial means the same axis shared by two or two group wheels, and the same axial direction means two or two group wheels with different axes but located in the same straight line and same axial direction.

For example, main wheels have two coaxial wheels and located at the middle of the body, one supplementary wheel each at the front and rear part of the body, four wheels shape like diamond (rhombus). Main wheels play the roles of loading, driving, braking and turning, these functions can realized by related technology; e.g. only drive or brake one of main wheels, the vehicle can turn the direction; only brake one of main wheels in movement, the vehicle can make the round in same place and consume inertia energy to play the role of braking. Of cause, it is possible to brake the wheels at same time. Weight or the gravity of a vehicle, mainly is borne by main wheels, so as to utilize the gravity.

Supplementary wheel plays the role of stability and balance, avoid the body to touch the ground in movement, keep stability in braking; supplementary wheel can perform the feature of anchoring plate, to bear part of load when the front or rear part of the body receive the pressure downward, the above said roles can be played when the vehicle in movement or in braking. Supplementary wheel connects flexibly with the body and can turn in parallel follow the body turning. Supplementary wheel can adopt universal wheel structure with related technology. Supplementary wheel carries an elastic device and be equipped with elasticity except the elasticity of tire, it can flex follow the pressure. In running, main wheels touch the ground while the supplementary wheel is unnecessary to touch the ground or slightly touch, or touch the ground in discontinuity; or, only one supplementary wheel touch the ground in running, or only one supplementary wheel slightly touch the ground or touch the ground in discontinuity. Of cause, there are two supplementary wheels each to be installed at the front and rear part of the body, there are four supplementary wheels in total. In this way, there are six wheel, two main wheels and four supplementary wheels. The number of supplementary wheel can depend on situation.

This invention adopts the liquid wheel in the Patent application 200410030581.x<A Sort of Vehicle>, the smaller the touchdown radius of the liquid wheel, the less the resistance. A light jelly, cream or semiliquid, the kind such as like as "aerogel" can be filled in liquid tire. Aerogel is a kind of jelly with light quality; it can transmit pressure in tire according to Pascal's Law.

One of the advantages in this invention is energy saving, i.e. to sufficiently use own weight by the structures of the gravity vehicle and swing connection designed by Circumferential Law, to realize the purpose of power and energy saving. A combination of eccentric axis and swing connection can save more energy. The second advantage is the structure of all vehicles is much more simple and reasonable than described in related technology. The third advantage is there is a new structure produced by dual-wheel and multi-wheel gravity vehicles and provide with more options. The fourth advantage is the wider applicability, available to all circle movement devices, such as human powered vehicle, motor vehicle, toy vehicle and space vehicle. The fifth advantage is safer by using of new braking method and new structure, avoid overturn due to its gravity declines and enhance its security in braking. The sixth advantage is cost reducing, due to the structure is greatly simplified, the manufacturing cost reduced. Moreover, the energy can be saved greatly during movement; therefore, not only decline the operating cost, but also benefit to the protection of global resources. The advantages of this invention are also specified in the relevant contents in the whole text.

BRIEF DESCRIPTION OF THE DRAWINGS

FIGS. 16-17 are drawings of structures of the connection between dolly-car and body swing.

FIG. 18 is a drawing of a structure of the circumferential substance gravity utilization (similar to the ball mill).

FIGS. 19-20 are drawings of movement of several dual-wheel vehicles.

FIGS. 33-34 are drawings of an air tank with the shape of round cake & baffle installed on the axis.

FIG. 35 is a drawing of an air tank with the shape of circinal loop.

FIG. 36 is a drawing of a round cake air tank installed as the axial direction outside the tire.

FIGS. 37-38 are drawings of a circinal loop air tank installed inside the rim of the tire.

DETAILED DESCRIPTION OF THE INVENTION

Figure 1:
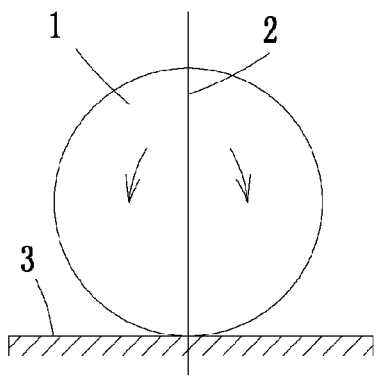
FIG. 1 is a sketch drawing of a circumferential substance being stressed by a force.

FIG. 1—Circumferential substance 1 can be a ball, or a cylinder, or a wheel and located on the load surface 3. Its weight surface 2 is located at the center of the circle. The weight surface 2 is fictitious, but the interface of the weight is in objective reality. A circumferential substance touch with the load surface can not but produces a weight interface, i.e. the weight interface. At both sides of the weight surface 2, the weight sizes are equal, directions are contrary. Although the weight is downward, but the both sides of the weight surface of the circumferential substance will produce two equal weights, their directions are contrary. The load surface includes the ground. If a perfect point or line of the circumferential substance touch with the firm load surface, whether different in their quality, the force to overcome the static inertia is greater than zero. The movement rule will follow Circumferential Law as foresaid in this article. This point is absolutely contrary with the Newton Law, which means Newton Law is not applicable to circumferential substance movement. It will be alternatively between us!

Figure 2:
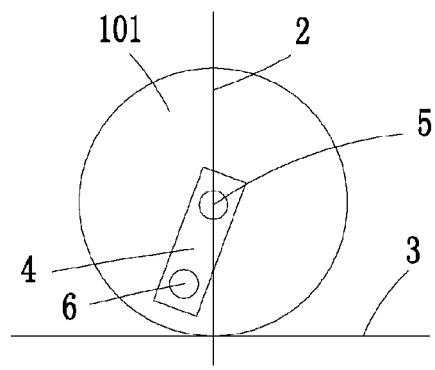
FIGS. 2-3 are sketch drawings of a kind of swing connection structure.
Figure 3:
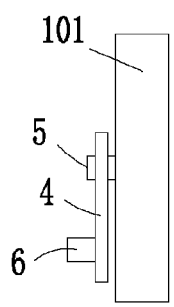

FIG. 2-3—Wheel 101 is circumferential substance and connects with swing bar 4 at the place of wheel axis 5, body axis 6 is at the swing bar 4, and it is used to connect with vehicle body. When swing bar 4 in the figure moves to the left side of the weight surface 2, the body weight will produce the gravity to the wheel 101 lean to the left side, this gravity will become the forward impetus. The circumferential substance 101 can act as the wheel for the wheels of all vehicles including train, automobile, trail car and human powered vehicle.

Figure 4:
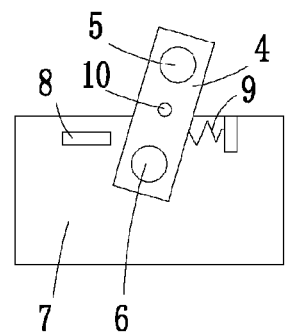
FIGS. 4-6 are drawings of three kinds of swing structures.

FIG. 4—Wheel here is omitted, there is a limit stake 8 on the body 7, limit pole 10 on swing bar 4, limit stake 8 and limit pole 10 can be used alternatively or synchronously. Besides, limit spring can be used also. They can play the role to limit the body swing on the wheel within a certain extent. The ratchet structure with related technology can also be available to limit the swing forward only.

Figure 5:
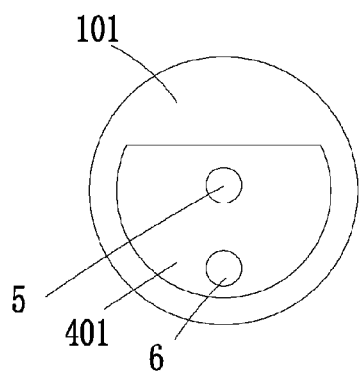
Figure 6:
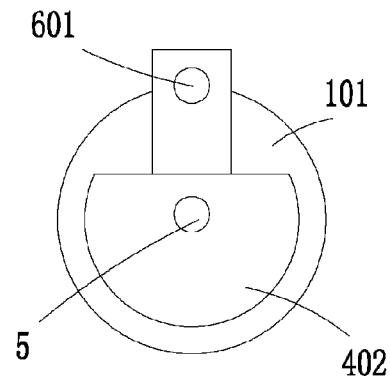

FIG. 5-6—Wobble tray 401 or 402 on the wheel 101, there are several structures for swing bar, 401 and 402 is the swing bar with different structure and with the same function of the swing bar 4 in FIG. 3. Wobble tray 401 shapes like flat plate or a round flat plate, a piece was cut off on the top in the figure. The geometry shape of a swing bar can be changed except its function of swing bar. The role of a swing bar is to connect the body and wheel and swing the body relative to the wheel. A swing bar has other functions, such as to carry a limit device. Wobble tray 402 is also equipped with the function to increase the swing extent. There is body axis 601 on the wobble tray 402; it expresses that to move the body axis from the underside of the circle center of the wheel to the upside, even higher than the wheel. As long as the gravity of the body not exceeds the circle center of the wheel, the body can not be overturn. But in multi-wheel vehicles, the gravity of the body can exceed the circle center of the wheel due to the balance of the supplementary wheel; the vehicle body can not be overturn.

Figure 7:
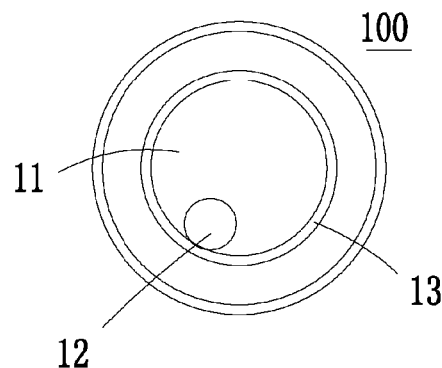
FIGS. 7-9 are sketch drawings of eccentric axes.
Figure 8:
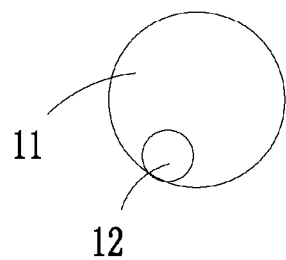
Figure 9:
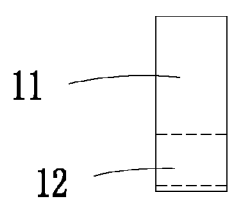

FIG. 7-9—FIG. 8 is the inner loop cover; FIG. 9 is a left-view diagram. There is inner loop cover 11 in inner loop 13 of the bearing 100, cover hole 12 on the inner loop cover 11. Inner loop cover 11 is fixed on the inner loop cover 13. Bearing 100 is installed on the wheel; bearing ball and inner loop 13 are similar with the "dolly-car" in large wheel transmission device. The body axis is fixed in the cover hole 12, equals to connect with inner loop cover 13. The body axis can be fixed on the inner loop by welding, covering or affixing, the figure displays the method of covering. In movement, the body axis can pull inner loop 13 to a certain angle and keep the body axis away from the weight surface of the wheel, i.e. swing the body relative to the wheel and change the gravity to forward impetus.

Figure 10:
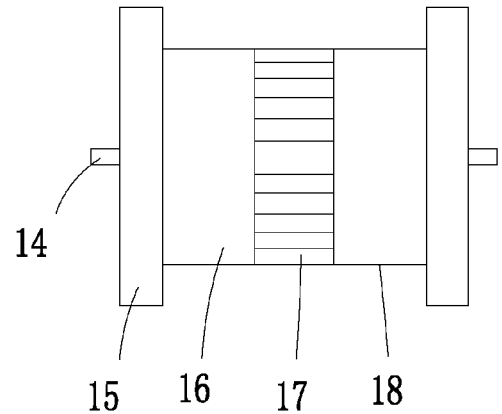
FIGS. 10-12 are drawings of three kinds of integrated vehicles.

FIG. 10—The vehicle body 16 combines with the wheels at its two sides and becomes an integrated vehicle 18. the body and wheels shape round, the left-view and right-view diagrams show a small round in a larger round, so the left-view and right-view diagrams was omitted. The diameter of the body is smaller than the wheel and keeps a certain distance from the ground to ensure the movement. The body runs following the wheels. The integrated vehicle can be used to carry cargo, such as coal, ore, petroleum and gluewater, etc. the integrated vehicle. There is no inlet or outlet as well as the inspection opening for cargo in the integrated vehicle, just like a tank truck. An integrated vehicle can carry roller 14, the trailer and vehicle tracks can be installed on it to control the movement of the vehicle. It is possible not to install engine on such vehicle and regard it as a trailer car when a trailer track installed on it. Gear 17 is used for receiving external force. The external force in this invention can be electromotor or internal-combustion engine. Such vehicle can be manned, unmanned or remote controlled.

Figure 11:
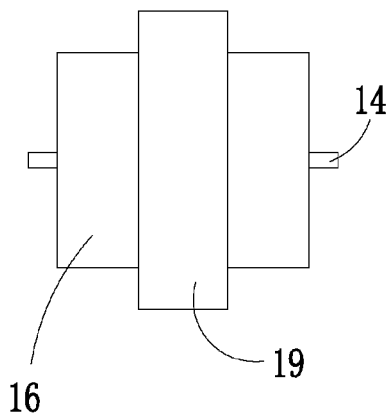

FIG. 11—To integrate the body 16 with the wheel 19, the body and wheels shape round, the left-view and right-view diagrams show a small round in a larger round, so the left-view and right-view diagrams was omitted. The diameter of the body is smaller than the wheel and keeps a certain distance from the ground to ensure the movement. The body runs following the wheels. Wheel 19 is located in the middle of the body, it can be a rubber loop to receive the impetus from the rubber roller upward and drive the vehicle.

Figure 12:
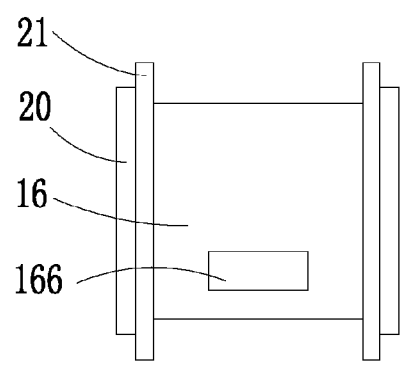

FIG. 12—To integrate the body 16 with the wheels 20 at its two sides, the body and wheels shape round, the left-view and right-view diagrams show a small round in a larger round, so the left-view and right-view diagrams was omitted. The diameter of the body is smaller than the wheel and keeps a certain distance from the ground to ensure the movement. The body runs following the wheels. Wheel 20 carries an upstanding side 21; there is cargo inlet and outlet 166 on the body 16. Such vehicle is used to drive on rail. The integrated vehicle can be used to transport water, oil, cement, coal, coal slurry and concrete, etc.

Figure 13:
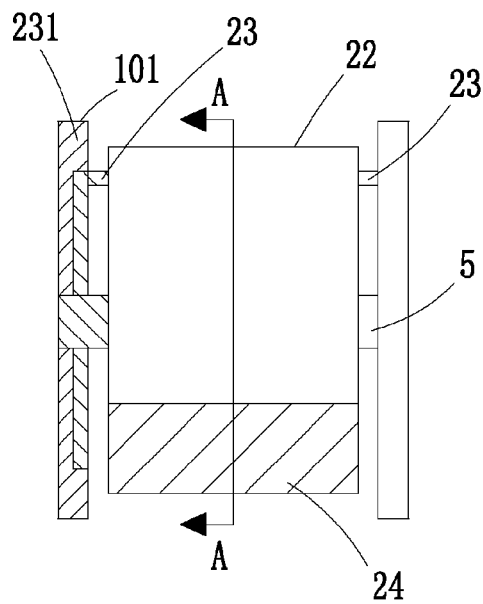
FIGS. 13-14 are drawings of a vehicle powered by compressed air.
Figure 14:
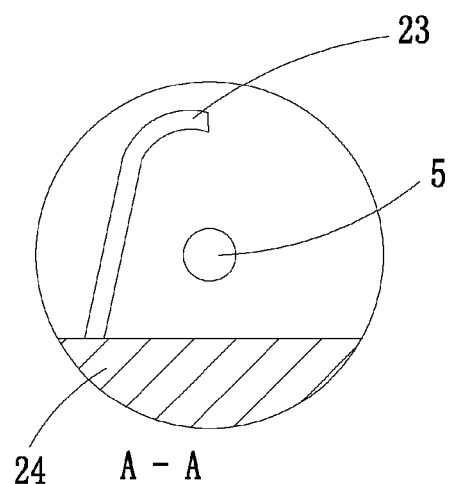

FIG. 13-14—FIG. 14 is an A-A cutaway view of FIG. 13. Body 22 connects with wheel 101 flexibly through wheel axis 5; these two coaxial wheels are located at the two sides of the body. It is possible to dispose tow or two group coaxial wheels at two ends of the body. The wheel can run relative to the body. The figure shows that: there is compressed air stored at the bottom of body 22. The huff nozzle 23 is located on the top of the body; huff nozzle 23 connects with the compressed air. There is baffle plate or lamina, or a concave around the wheel as well as the air valve, the device with related technology. FIG. 13 shows the left wheel and the baffle plate around the wheel. During the vehicle moving, huff nozzle blow the air to the baffle plate or concave at upper fringe and drive the wheel running; meanwhile, huff nozzle produce counter force to the body. The counter force play the role of leverage through wheel axis 5, the bottom of the body 22 inclines forward, and the weight shifts ahead too, the weight now changes to impetus. Again, due to the bottom of the body is heavier, cause the weight greater. The bottom of the body 22 is heavier than the top, so the vehicle can not be overturn. Such vehicle can carry supplementary wheel or anchoring plate also to avoid the vehicle overturn.

Figure 15:
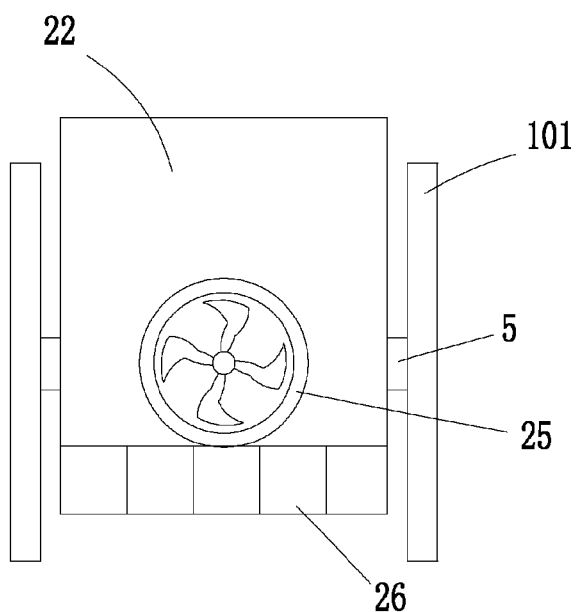
FIG. 15 is a drawing of a vehicle powered by electric fan.

FIG. 15—There is a storage battery 26 at the bottom of body 22 to supply the power for electric fan 25, the electric fan blow the air backward to drive the vehicle. Electric fan 25 makes the bottom of body 22 inclines forward, shift the weight ahead and change the weight into impetus. Due to the bottom of body 22 is heavier than the top, so it is possible thon the top of body 22 is higher than the wheel. Electric fan 25 can be located at the middle or the top of the body too, electric fan blows the air backward and drive the vehicle. Electric fan can be substituted by jet engine or compressed air. Jet engine or compressed air can be installed on the body, blow the air backward and drive the vehicle.

FIG. 16-17—A "dolly-car" 27 is inside the wheel 101, the small wheel of dolly-car 27 moves at the bottom of wheel 101. By Plea Know technology, to dispose dolly-car and wheel 101, the body connects with two body axes 601. Such dual-axis swing connection can bear heavier load. Two body axes swing at same time and the effect is as same as single swing. In this invention, the body axis can be one, two or more. There are two swing axes 501, located at the upper middle position in the parallel line of wheel; due to the bottom of the body is much heavier, so dolly-car 27 can never loss its barycenter inside the wheel 101 and overturn. Such structure is of a kind of "large wheel transmission". Wheel 101 is large wheel 101, wheel 101 runs relative to dolly-car 27. Just as like as there is electromotor and gear on the top of dolly-car, an internal gear ring is installed on wheel 101, power supply is inside the body, direct supply the power to electromotor, transmit on the top of wheel and drive the wheel 101 running around the wheel axis 502, and push the dolly-car 27 moves forward, dolly-car 27 bring the vehicle body following the wheel 101 moves forward. Due to the body can swing forward and make the weight in a status of inclining forward and change the weight into the impetus.

FIG. 17 is A-A cutaway view of FIG. 16. Dolly-car 27 has the same circle center with large wheel 101; the position of large wheel 101 is limited by wheel axis 502. Wheel 502 does not load the weight, nor limit the movement come-and-go of the large wheel, it limits the position of the large wheel 101 only to prevent it dislocate from the axial direction. Dolly-car rack also plays the role of the position limit to the large wheel 101, the area of dolly-car rack is greater 50% and above than the large wheel 101, it top exceeds the center parallel line of the large wheel 101 and has a caging device relative to the large wheel 101, such as the facette, to make the position of the large wheel 101 controlled by dolly-car 27. Wheel axis 502 can be connected with the body flexibly, there is a long round hole on the body and the wheel axis 502 can move inside the round hole, no any influence to the swing of the body or the movement of the large wheel. Wheel axis 502 also can play the role of position limit to swing bar 401 to limit its swing extent. It is possible for a vehicle to have two or more such wheels. Wheel 101 can be the wheel for any vehicle, including trail car and human powered vehicles.

FIG. 18—Circumferential substance 102 represents a ball mill, concrete blender or a tumbling-box washing machine. The installation and the transmission method of such machines are unreasonable by Plea Know technology, no "gravity surface" and waste power. In this invention, to dispose such circumferential substance 102 on base wheel 30, base wheel shall be installed on the base seat 31 by related technology to run the base wheel relative to circumferential substance 102. Two or more base wheels can be disposed around the axial direction of circumferential substance 102 to bear the weight, make the bottom of circumferential substance 102 close to the ideal point or line connection of the base wheel 30, establish a weight surface to save energy by the weight. A rotary wheel 32 can be set up at two sides of circumferential substance 102 to keep it in perfect position. To install rotary wheel 32 by related technology, make it running followed by circumferential substance 102. It is possible to have two or more rotary wheels as same as base wheels and to be disposed around the axial direction. FIG. 18 only shows the surface, two or more base wheels and rotary wheels are same as such structure. A transmitting wheel 29 is on the top of circumferential substance 102 and to be driven by an engine to bring circumferential substance 102 running. The installation of transmitting wheel and engine can be completed by related technology. Transmitting wheel 29 can be located at the middle or the bottom of circumferential substance 102. To use roller bearing on base seat 31 because the load of a roller bearing is greater, the pressure of a rotary wheel is less, so roller bearing is applicable. Base seat 31 can be substituted by a magnetic suspension device.

FIG. 19—One driver is needed only for the combination of four or more dual-wheel vehicles to save human power and the space within vehicles. The connection device or method between two vehicles can adopt the method of a train, not only to be connected with pothook 34, but also wire, water pipe and others. Change the wheels of dual-wheel vehicle 33 into the train wheel which carries the upstanding side, such vehicle can run on the rail. FIG. 20 shows: pothooks 34 are carried by body 222 at front and rear parts, each section of dual-wheel vehicle can be the head vehicle and has driver seat and runs forwardly and reversely. Each section of dual-wheel vehicle 33 can has its own driving device, it can solely run solely or run as a string as shown in the figure. When running as a string, each section can be driven by own engine and form a composition force. It is convenient for driving due to each vehicle has own controlling capability. Also, a dual-wheel vehicle does not carry own engine and to be used as a trail car, driven by the main vehicle. Main vehicle means the head vehicle, it provides impetus and controlling. Several integrated vehicles which carry trail racks or pothooks can form a train and be towed by a head vehicle.

Figure 21:
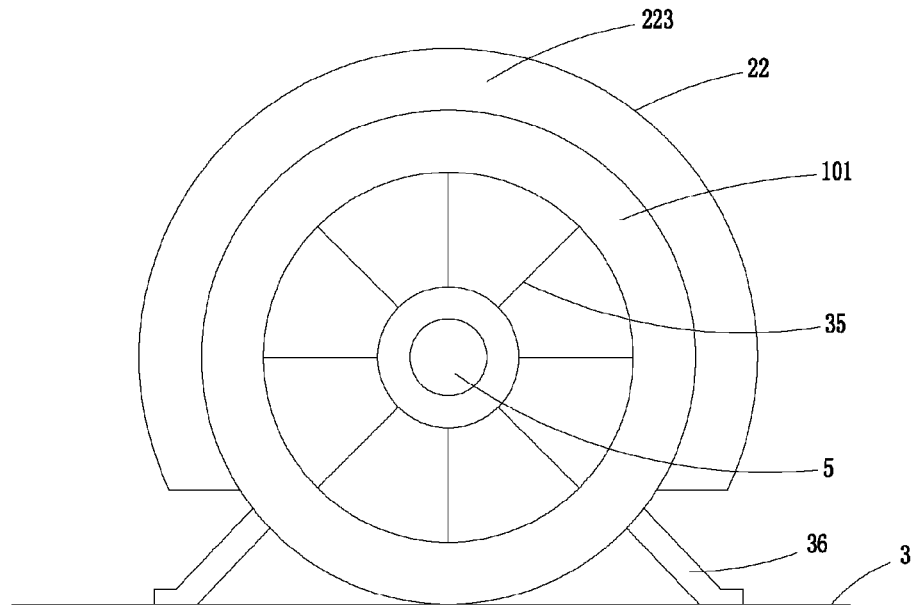
FIGS. 21-22 are drawings of structures of a sort of dual-wheel vehicle.
Figure 22:
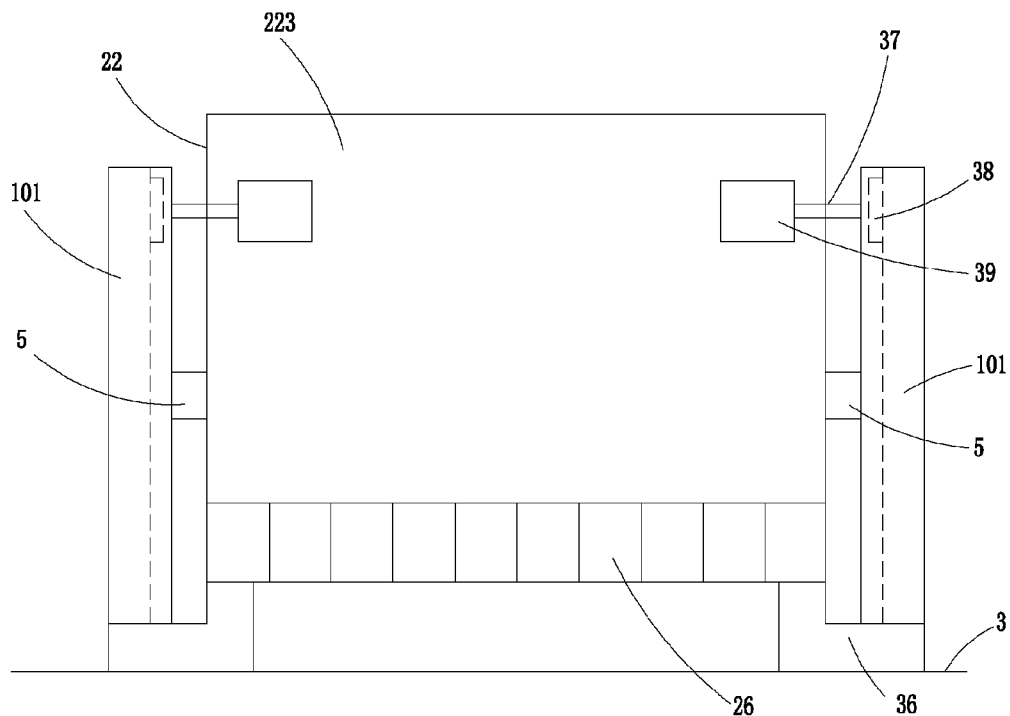

FIG. 21 is the left-view diagram of FIG. 22; dual-wheel vehicle 22 is composed by large wheel 101 and body 223 as well as two anchoring plates 36, anchoring plates 36 stands on the ground 3 to play the roles of braking and stability. Anchoring plates will be picked up pulled up during movement. The wheels of a dual-wheel vehicle are comparatively larger and close to the body. Vehicle rung shapes as a strip. Wheel axis 5 connects with wheel and body. Electromotor 39 is located on the top of body 223, one at each side and to be installed by related technology. There is gear 38 on the electromotor; an internal gear ring matched up to the gear is carried by wheel 101. The internal gear ring is driven by gear 38. Although the body can swing against the wheel, but the extent is not so great, can never influence to the transmission from the gear 38 on the body to the internal gear ring on the wheel. The body can swing around the circle centre of wheel axis, the body has the same circle centre with the wheel, the swing direction and the radius of the body are consistent with that of internal gear ring of the wheel, so it can not influence to the normal operation. The counter force of gear 38 to the top of body can transmit to the bottom of the body through wheel axis 5 and makes the bottom of body inclining forward, the weight shift forward too, and change the weight into impetus. Power supply 26 is located at the base of the body to decline the barycenter and increase the effective weight. Power supply 26 provides the power to electromotor. Within the body, driver seat and relative facilities as well as the passenger seat can be set up by related technology. It is possible not to set up driver seat. As shown in FIG. 20, it is necessary to set up connection device, such as pothook in cabin. Electric axis and electric wheel engine with related technology are also available. To brake the wheel at one side can complete the functions of turning or shut down. The broken line in FIG. 22 shows gear and internal gear ring.

No engine can be carried for a dual-wheel vehicle; such vehicle can be used as trial car or human power vehicle. The body can shape as a square, flat plate or others with Plea Know technology. To drive the vehicle by human power is also available, in this case, only need to change electromotor to human powered device. To use chain wheel device transmit the human power to the top of large wheel 101 to drive the vehicle.

Figure 23:
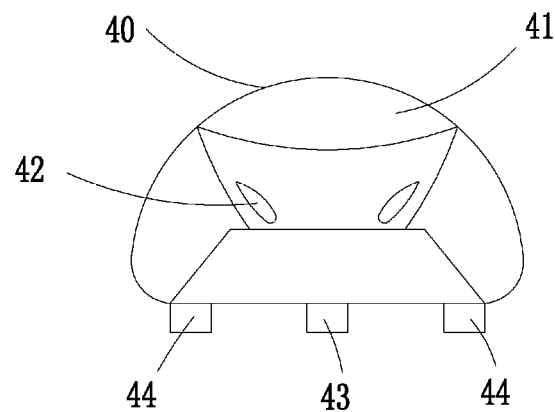
FIGS. 23-25 are drawings of structures of a sort of quad-ricycles.
Figure 24:
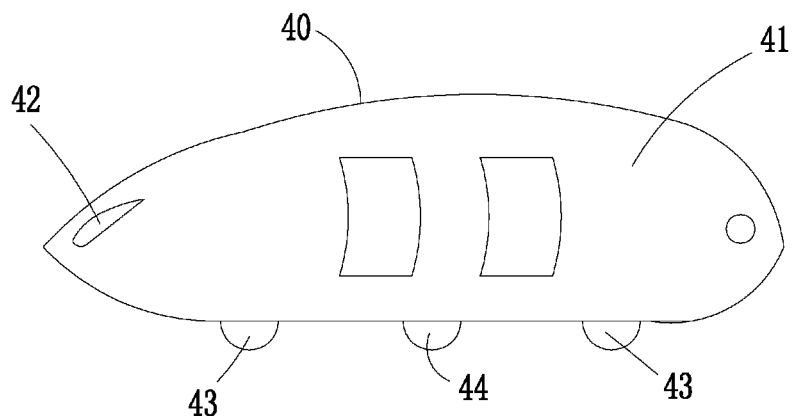
Figure 25:
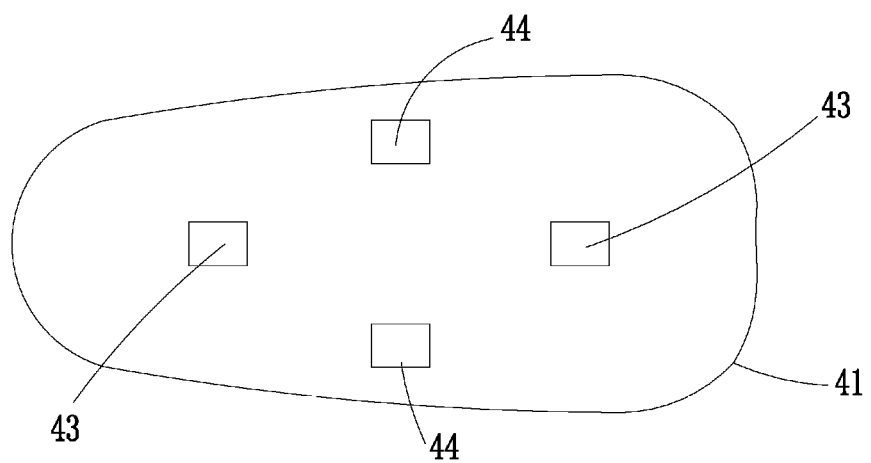

FIG. 23-25—FIG. 23 is the left-view diagram of FIG. 24; FIG. 25 is the upward-view diagram of FIG. 24. All wheels are located at the bottom of the body. Four wheels 44 of quadricycle are disposed as diamond, two main wheels 44 are coaxial wheels and located the middle of the body, two supplementary wheels 43 are located at front and rear of the body. This is a kind of gravity vehicle. Wheel 44 can adopt the structure of FIG. 16 and "large wheel transmission". It is also available to adopt the wheel electromotor described in <A Sort of Vehicle> of Plea Know technology document 200410030581.x. Vehicle body connects with wheel swing. Supplementary wheel can run in parallel to match up turning. Supplementary wheel carries an elastic device which flexes up and down following pressure, the wheel is unnecessary to touch the ground or slightly touch, or touch the ground in discontinuity, or, only one supplementary wheel touch the ground. Only need one main wheel can realize turning and braking, to use two main wheels at same time can brake or decelerate the vehicle.

Figure 26:
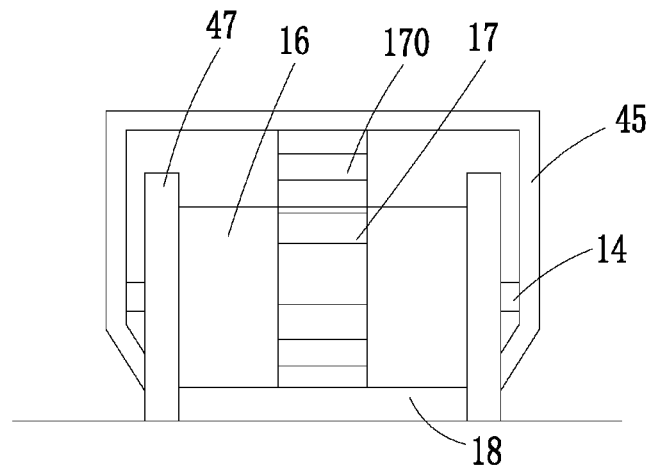
FIGS. 26-28 are drawings of structures of a sot of integrated vehicle.
Figure 27:
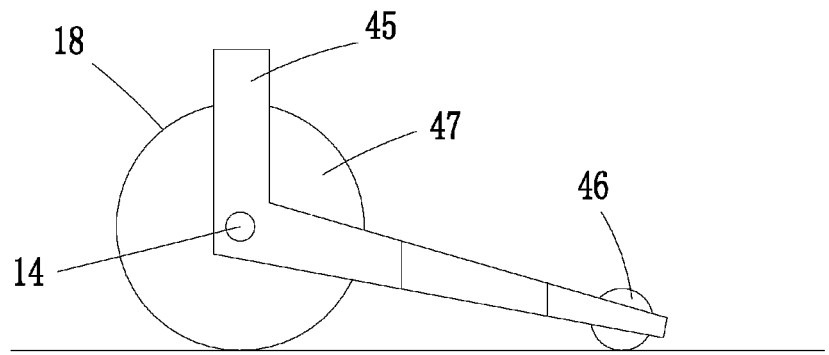
Figure 28:
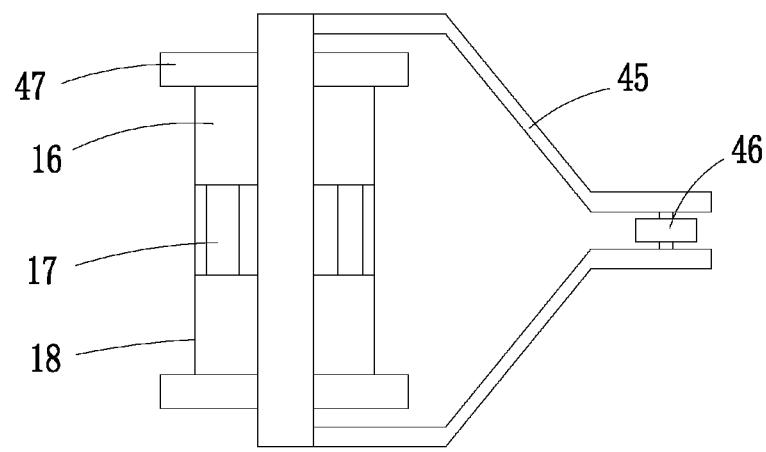

FIG. 26-28—FIG. 26 is the left-view diagram; FIG. 28 is the top-view diagram of FIG. 27. An integrated vehicle 18 carries a rack beam 45; an electromotor 170 and trail wheels 46. Electromotor 170 is located at the bottom of the rack beam 45 and on the top of integrated vehicle 18. Electromotor 170 drives gear 17 and pushes the vehicle forward. Trail wheel 46 plays the role of balance. Such vehicle can also be unmanned or remote controlled. The body 16 can optionally include a compressed air tank 47. Details of the compressed air tank 47 are described in FIG. 33-35.

Figure 29:
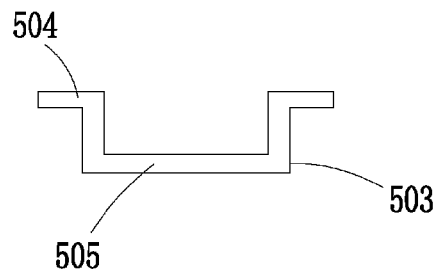
FIG. 29 is a drawing of a sort of pendulum shaft with swing structure.

FIG. 29—Pendulum shaft 503 shows a structure of bend and concave, wheel axis 504 is integrated with the body axis 505, wheel axis 504 connects with wheel, and body axis connects with body. This is an axle with swing structure, pulling the body, the body swing forward and change the weight into impetus. The swing bar connects with wheel and body, the body is installed inside the structure of bend and concave.

Figure 30:
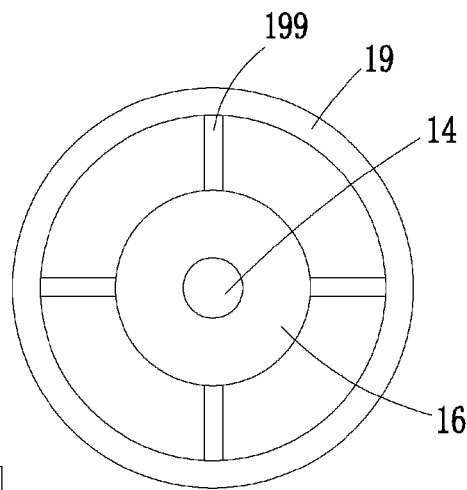
FIG. 30 is a drawing of a sort of wheel with part of wheel rim.

FIG. 30—Wheel 19 is installed on the body 16 of the integrated vehicle with tire and part of rim 199.

Figure 31:
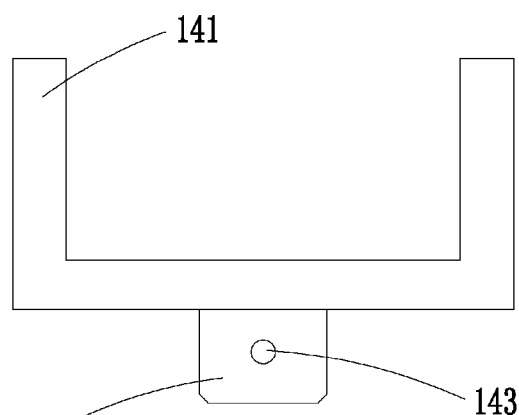
FIGS. 31-32 are drawings of a trailer rack of the integrated vehicle.
Figure 32:
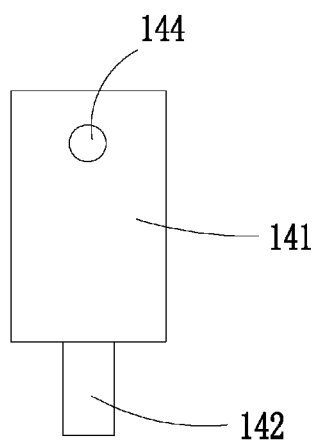

FIG. 31-32—FIG. 32 is the left-view diagram of FIG. 31, trail rack 141 shapes like a semi-frame, trail rack 141 is equipped with a juncture 142 and a juncture hole 143 is on it. Trail rack 141 carries an axial hole 144 to connect with roller 14. It is unnecessary to carry power for an integrated vehicle and to be regarded as the trail car when it is installed on a rack.

Figure 33:
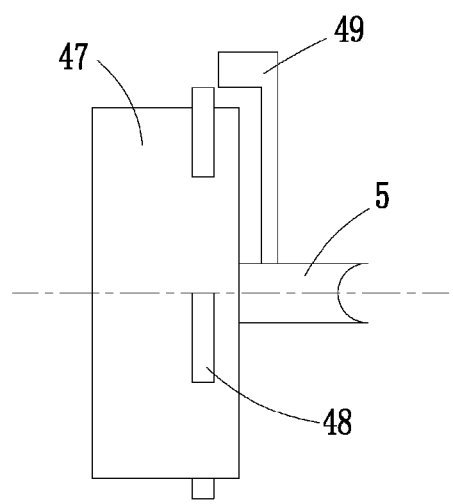

FIG. 33-34—FIG. 34 is the left-view diagram of FIG. 33. The compressed air tank 47 shapes like a round cake, there is a huff nozzle 48 on it, wheel axis 5 carries baffle plate 49.

FIG. 35—Air tank 50 shapes like a hollow round loop, a huff nozzle 48 is on it.

FIG. 36—Air tank is installed on the position of axial direction outside the wheel 101 (also can be installed on large wheel 101 shown in FIG. 22). Air tank can be installed on any side of the position of axial direction outside the tire.

Figure 38:
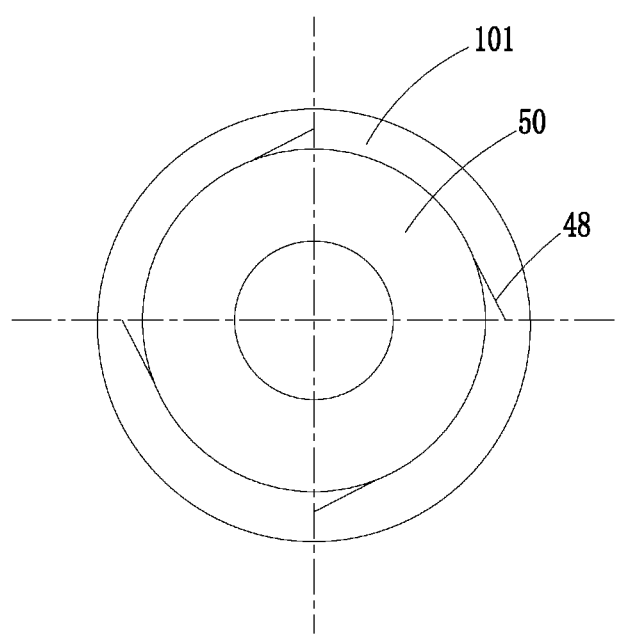

FIG. 37-38—FIG. 37 is the left-view diagram of FIG. 38. Most part of air tank is to be installed inside the tire rim; a huff nozzle 48 is at the bare part.

This invention is applicable to all devices and method with circumferential movement, including automobile, train, space vehicle, toy vehicle, crane, trail car, blender, and ball mill, etc. all technical resolutions and technical features in this invention can be used solely or in combination and not limit to a certain example case described in this manual and the figures attached.

What is claimed is:

1. A vehicle comprising: at least one wheel and a vehicle body, wherein the at least one wheel and the vehicle body are combined to become a whole, the at least one wheel installed at a middle or two ends of the vehicle body and rotated with the vehicle body at the same time in movement; the wheel comprising a tire and a rim; the two ends of the vehicle body comprising end surfaces of two ends and positions near the two ends; and,
   an engine being installed on the vehicle body, the vehicle body having a passenger seat;
   wherein the vehicle having two or two group coaxial wheels as main wheels, the main wheels being located at a middle bottom of the vehicle body, at least one supplementary wheel being also carried on the vehicle body, the at least one supplementary wheel being installed at the front and rear part of the vehicle body, the main wheels playing the roles of loading, driving, braking and turning, in running, the main wheels touching the ground while the at least one supplementary wheel not touching the ground or slightly touching the ground or touching the ground in discontinuity, or, the main wheels touching the ground while only one supplementary wheel touching the ground or slightly touching the ground or touching the ground in discontinuity, the coaxial wheels comprising the wheels with the same axial direction, the coaxial meaning the same axis shared by two or two group wheels, the same axial direction meaning two or two group wheels with different axes but being located in the same straight line and same axial direction, wherein the at least one supplementary wheel plays the role of stability and balance to avoid the vehicle body to touch the ground in movement, the at least one supplementary wheel bears part of load when the vehicle body receives a pressure downward, the at least one supplementary wheel connects flexibly with the vehicle body and turns in parallel following the vehicle body turning, the at least one supplementary wheel carries an elastic device and is equipped with elasticity except the elasticity of tire.

2. The vehicle as claimed in claim 1, wherein at least one trailer rack is installed on the vehicle to be used as a trail car; or, the vehicle comprises at least one vehicle head and several vehicle bodies with trailer racks and pothooks, the vehicle bodies are connected to become a train dragged by the vehicle head; or, the vehicle comprises at least one trailer rack, at least one engine is fixed on the trailer rack and at least one transmission device is fixed on the vehicle body to receive the transmission force from the engine.

3. The vehicle as claimed in claim 2, wherein the trailer rack carries one or more trailer wheels.

4. The vehicle as claimed in claim 2, wherein the engine is an electromotor, a rubber roller is on the axis of the electromotor, the electromotor is fixed on the top of the vehicle body, there is a rubber loop on the vehicle body to receive the friction from the rubber roller, the rubber roller drives the rubber loop and pushes the vehicle to move together.

5. The vehicle as claimed in claim 2, wherein the transmission device comprises a rubber roller device, a gear wheel driving device, a gear hole driving device, a chain or a transmission shaft and gear wheel driving device, a strap and strap wheel driving device.

6. The vehicle as claimed in claim 1, wherein the vehicle further has an anchoring plate acting as a brake.

7. The vehicle as claimed in claim 1, wherein the vehicle body has inlets and outlets of cargo.

8. The vehicle as claimed in claim 1, wherein the vehicle has only one wheel installed at a middle of the surface of the vehicle body; or, the vehicle has only one wheel, the width of tire reaches to ⅓ of the width of the vehicle body or above; or, at least one wheel is installed on the whole surface of the vehicle body.

9. The vehicle as claimed in claim 1, wherein the vehicle body has an engine and a transmission device thereon, the driving force of the engine is first transmitted to the top position of the wheel of the vehicle body, then is transmitted to the top edge of the wheel; or, the transmission device firstly transmits the strength of human to the position on the vehicle body above the wheel, then drive the wheel.

10. The vehicle as claimed in claim 1, wherein there is at least one huff nozzle on the position on the vehicle body above the wheel first, puff the air above the wheel, there is baffle plate, or lamina, or a concave which receive the puffing air around the wheel; or, at least one jet engine is installed on the vehicle body to puff the air backwards to thereby drive the vehicle to run forwards; or at least one compressed air tank which loads compressed air is fixed on the vehicle body to puff the air backwards at the rear of the vehicle body to thereby drive the vehicle to run forwards; or at least one electric fan is fixed in the middle or top of the vehicle body to blow the air backward to drive the vehicle.

11. The vehicle as claimed in claim 1, wherein there is respectively one supplementary wheel at the front and rear part of the vehicle body, two main wheels and two supplementary wheels are shaped as rhombus; or, the vehicle body has more than two supplementary wheels.

12. The vehicle as claimed in claim 1, wherein at least one compressed air tank is installed in the steel rim or the position with the same axial direction outside the wheel, the compressed air tank is shaped as a circle pipe or round cake which is suitable to the shape of tire, there are several huff nozzles around the compressed air tank to puff the air backwards at the rear of the vehicle body and drive the vehicle to run forwards.

13. The vehicle as claimed in claim 12, wherein at least one valve is fixed at the at least one huff nozzle, the valve is opened until the wheel runs to the peak position; or, the compressed air tank comprises several huff nozzles, there is an elastic cover on the each huff nozzle, the cover run around the axis, a baffle plate is disposed at the peak position of the wheel, when one huff nozzle runs to the peak position, the baffle plate pull out the elastic cover and the high pressure air huff burst out to produce thrust, the elastic cover closes again when the nozzle runs over the baffle plate, next nozzle will repeat the above movement; or, there is a magnet mounted at the position of baffle plate, when a huff nozzle runs to the peak position, the attraction of the magnet opens the elastic switch, high pressure air huff out and produce thrust, the elastic cover closes again when the nozzle runs over the baffle plate, next nozzle will repeat the above movement; or, the baffle plate is fixed on the wheel axis; or blowing is intermittent blowing, blow the air at each interval.

14. The vehicle as claimed in claim 1, wherein the vehicle body is connected with the at least one wheel by a swing structure, the vehicle body being capable to match up the swing of the wheel.

15. The vehicle as claimed in claim 14, wherein there is an axis on the vehicle body and an axis at the centre of a wheel, the diameter of the vehicle body axis is smaller than that of axis hole of the wheel at the circle centre, the body axis connects with the wheel axis hole and be located at the fringe of the bottom of inner loop of the axis, the connection method between the vehicle body axis and the axis hole includes welding, affixing or covering.

16. The vehicle as claimed in claim 14, wherein there is at least one swing bar between the wheel and the vehicle body, one end of the swing bar connects with the body axis, the other end of the swing bar connects with the wheel axis; the swing bar can be a shaft or a wobble tray, the wobble tray shapes like a circle, semicircle, or anomalous.

17. The vehicle as claimed in claim 16, wherein there is at least one caging device on the vehicle body or the swing bar or the wheel, the caging device includes a stake, a step or a spring.

18. The vehicle as claimed in claim 14, wherein there is at least one swing bar between the wheel and the vehicle body, the swing bar has bent and concave structure, the vehicle body installs inside the concave.

\* \* \* \* \*